United States Patent Office 3,516,924
Patented June 23, 1970

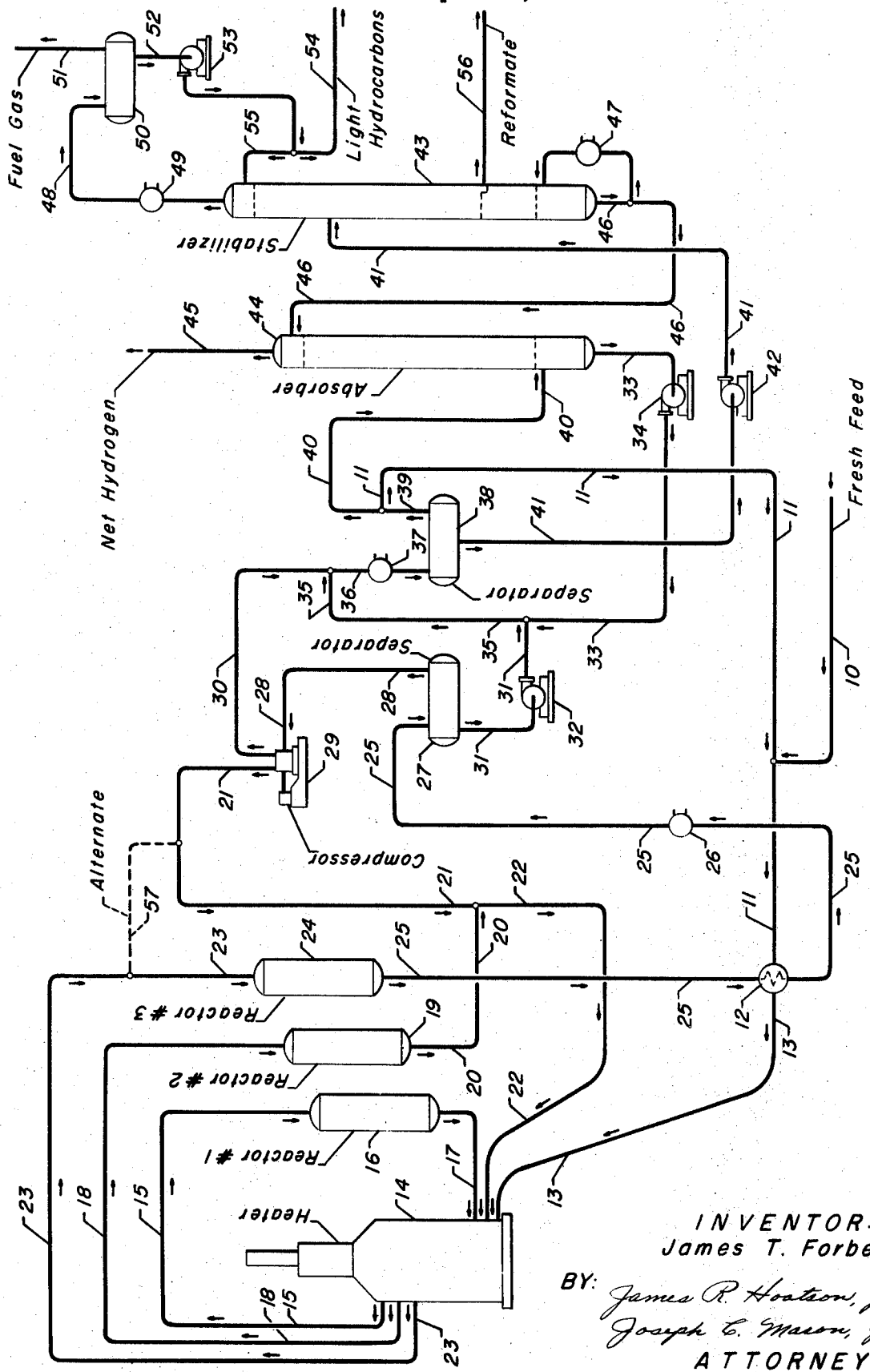

---

3,516,924
CATALYTIC REFORMING PROCESS
James T. Forbes, Des Plaines, Ill., assignor to Universal
  Oil Products Company, Des Plaines, Ill., a corporation
  of Delaware
Filed Apr. 19, 1968, Ser. No. 722,700
Int. Cl. C10g 35/08
U.S. Cl. 208—65                                  8 Claims

ABSTRACT OF THE DISCLOSURE

Method and process for the catalytic reforming of hydrocarbons in the presence of hydrogen, preferably, to produce high quality gasoline boiling range products. The recycle hydrogen gas is split into several fractions; one portion is compressed to a low pressure and returned to the reaction zone; another portion is compressed to a high pressure and returned at least in part to the reaction zone.

BACKGROUND OF THE INVENTION

This invention relates to the dehydrogenation of hydrocarbons. It particularly relates to the catalytic reforming of hydrocarbons to produce gasoline boiling range products. It specifically relates to a method for upgrading the hydrogen gas for recycle to the catalytic reforming reaction zone.

It is well known in the art that high quality aromatic hydrocarbons, such as benzene, toluene and xylene, may be produced by the catalytic reforming process wherein naphtha-containing feedstocks are passed over platinum-containing catalyst in the presence of hydrogen in order to convert at least a portion of the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of hydrogen, however, is required for recycle purposes in order that a proper partial pressure of hydrogen may be maintained over the catalyst in the catalytic reforming zone.

However, the catalytic reforming reaction also involves a hydrocracking function which segments hydrocarbons into relatively low molecular weight hydrocarbons, such as $C_1$, $C_2$, $C_3$, etc. hydrocarbons and, in particular, the $C_2+$ hydrocarbons which then become contaminants in the gaseous hydrogen which is to be recycled to the reaction zone. In addition, these contaminants have the effect of lowering the hydrogen purity to such an extent that frequently purification techniques must be used by those skilled in the art before the net hydrogen from the reformer can be used in other chemical reactions requiring relatively high purity hydrogen. Low hydrogen purity also has a significant effect on the reforming reaction by way of requiring considerable quantities of low purity hydrogen in order to maintain the hydrogen partial pressure in the reaction zone at the proper level, as previously mentioned.

As those skilled in the art are familiar, the reforming reaction must have a hydrogen atmosphere in order for the proper chemical reactions to take place. This means, of course, that the separated hydrogen gas referred to hereinabove must be returned to the reaction zone. Due to the large pressure drop through a conventional catalytic reforming system, the separated gas for recycle purposes must be compressed to at least the pressure of the reaction zone before it can be returned and properly used. Heretofore, the size of the compressor has been a significant cost factor in constructing and operating catalytic reforming units for the production of gasoline boiling range products, such as benzene, toluene, and xylene. In other words, the large horsepower requireemnt for the recycle hydrogen compressor is a substantial capital investment item and a substantial operating cost item for any catalytic reforming unit.

Consequently, it would be desirable to operate the catalytic reforming process so as to produce, consistently, relatively high purity hydrogen not only for recycle purposes, but also for other uses outside the catalytic reforming system. Furthermore, it would be highly desirable to operate the catalytic reforming process in a more economical manner while maintaining product quality and quantity at predetermined levels.

SUMMARY OF THE INVENTION

Therefore, it is an object of this invention to provide a process for the dehydrogenation of hydrocarbons.

It is another object of this invention to provide a method for the catalytic reforming of hydrocarbons to produce gasoline boiling range products.

It is a particular object of this invention to provide a method for reducing the compressing cost for recycle hydrogen in a catalytic reforming operation.

It is a specific object of this invention to provide a catalytic reforming method in a facile and economical manner.

Accordingly, the present invention provides a method for catalytically reforming a hydrocarbon fraction boiling in the range from about 90° F. to about 450° F. which comprises the steps of: (a) admixing said hydrocarbon fraction and a hereinafter specified hydrogen stream; (b) subjecting said admixture from Step (a) to catalytic reforming conditions in a first reaction zone; (c) admixing the effluent from said first reaction zone and a hereinafter specified hydrogen stream; (d) subjecting said admixture from Step (c) to catalytic reforming conditions in a second reaction zone; (e) separating the effluent from said second reaction zone into a hydrogen fraction and a liquid hydrocarbon fraction; (f) compressing a portion of said hydrogen fraction of Step (e) to a relatively low pressure thereby producing a first hydrogen stream; (g) compressing another portion of said hydrogen fraction of Step (e) to a relatively high pressure thereby producing a second hydrogen stream; (h) returning said first hydrogen stream to admixture with the effluent from said second reaction zone as specified in Step (c); (i) returning at least a portion of said second hydrogen stream to admixture with said hydrocarbon fraction as specified in Step (a); and, (j) recovering reformed hydrocarbons from the liquid hydrocarbon fraction of Step (e).

Another embodiment of this invention provides a method for dehydrogenation which comprises dehydrogenating a dehydrogenatable material in the presence of recycle hydrogen in a reaction zone to yield an effluent containing hydrogen admixed with dehydrogenated normally liquid products; separating said effluent into a gaseous stream comprising relatively impure hydrogen and a liquid stream containing dehydrogenated product; compressing a portion of said gaseous stream to a relatively low pressure; compressing another portion of said gaseous stream to a relatively high pressure; admixing the compressed relatively high pressure gaseous stream with at least a portion of said liquid stream; separating said admixture into a gaseous fraction comprising relatively pure hydrogen and a liquid stream containing dehydrogenated product; returning said relatively pure hydrogen stream to said reaction zone in admixture with said dehydrogenatable material; returning the compressed relatively low pressure stream to said reaction zone; and, recovering dehydrogenated product in high concentration.

Thus, it can be seen from the above embodiments that this inventive flow scheme is significantly different from the conventional catalytic flow scheme at least in the concept of withdrawing a portion of the recycle gas from the recycle gas compressor at a lower pressure point. Preferably, the remainder of the recycle hydrogen gas is further compressed and purified by recontacting with liquid separated from the reaction zone effluent. The high pressure recycle hydrogen gas is then combined with the fresh feed and passed into the first reaction charge heater for the conventional situation which utilizes a plurality of fixed bed reaction zones. The low pressure recycle hydrogen gas is combined with the effluent from the next to last reactor and passed into the final reactor either at the heater inlet or at the last reactor inlet.

As will become more evident from the detailed discussion presented hereinbelow, the major benefit obtained from splitting the recycle gas into at least two pressure levels is to reduce the cost of utilities, particularly, the cost of installing and operating the recycle gas compressor.

DETAILED DESCRIPTION OF THE INVENTION

The art of a catalytic reforming and the broad art of dehydrogenation of hydrocarbons is well known to those skilled in the art and need not be discussed in great detail herein. In brief, suitable charge stocks for use in the catalytic reforming operation to produce gasoline boiling range products, such as aromatic hydrocarbons, are those which contain both naphthenes and paraffins in relatively high concentration. Such feedstocks include narrow boiling range fractions, such as naphtha fractions, as well as substantially pure materials, such as cyclohexane, methylcyclohexane, and the like. The preferred class of suitable feedstocks for the catalytic reforming operation includes primarily straight-run gasolines, such as the light and heavy naphtha. It is distinctly preferred to use a naphtha fraction boiling between, say, 90° F. and 450° F. as the feedstock to the catalytic reforming operation.

The preferred types of catalyst for use in the catalytic reforming process are well known to those skilled in the art and, typically, comprise platinum on an alumina support. These catalysts may contain substantial amounts of platinum, but for economic and quality reasons, the platinum will, typically, be within the range from 0.05% to 5.0% by weight platinum.

Satisfactory operating conditions for the catalytic reforming operation includes the presence of the hereinabove mentioned catalysts and temperatures of about 500° F. to about 1050° F., preferably, from 600° F. to 1,000° F.; pressures from about 50 p.s.i.g. to about 1200 p.s.i.g., preferably from about 100 p.s.i.g. to 300 p.s.i.g.; a weight hourly space velocity within the range from about 0.2 to 40; and the presence of a hydrogen-containing gas equivalent to a hydrogen to hydrocarbon mol ratio of about 0.5 to about 15.0.

Conventionally, the catalytic reforming operation is carried out in a fixed bed reaction zone. Usually a plurality of catalyst beds are also used either in stacked fashion within a single reactor shell or, more preferably, in separate reactors. A single reactor with a single catalyst bed may be utilized, but, preferably, a plurality of catalyst beds are used. Still more preferably, in the practice of this invention from 2 to 5 catalyst beds maintained in separate reactor vessels are utilized. As an example, four (4) separate reactor beds are used to illustrate the preferred embodiment of this invention.

The amount of catalyst used in each reactor bed may be varied considerably depending upon the characteristics of the feedstock and the purpose for which the conversion reaction is carried out. In the preferred embodiment of this invention, for example, the catalyst may be deposed in the separate reactors in the following manner: 10%, 15%, 25%, and 50% by weight catalyst, respectively. Other variations of reactor geometry and catalyst volume will be evident to those skilled in the art from general knowledge and the specific teachings presented herein.

It is to be noted that one facet of the present invention requires that the relatively high pressure recycle hydrogen gas be introduced into the first reactor of a plurality of reactors while the relatively low pressure recycle hydrogen gas is introduced into the last reactor or catalyst bed of the plurality. Furthermore, it is to be noted that the relatively high pressure hydrogen gas is further contacted with at least a portion of the liquid product which has been separated from the reaction zone. This admixture at relatively high pressure is then cooled and passed into another separation zone from which is yielded a relatively pure hydrogen-containing stream at least part of which is utilized for recycle to the reaction zone in the manner discussed hereinabove and the remainder of which, if any, is suitable for use in other hydrogen consuming operations, and a yield of a normally liquid product containing the reformed and/or dehydrogenated hydrocarbons.

In the practice of this invention it is distinctly preferred that the relatively high pressure be at least 50 p.s.i. greater (or higher) than the relatively low pressure. Additionally, it is another facet of this invention that the relatively low pressure be at least 20 p.s.i. greater (or higher), e.g. 30 p.s.i. higher, than the pressure of the effluent leaving the last reaction zone in the plurality of reaction zones. In other aspects it is distinctly preferred that the entire catalytic reforming operation be carried out at the lower end of the pressure scale rather than at the higher end, to wit: a pressure of from 100 to 300 p.s.i.g. This means then that for practical purposes, the pressure suitable for elevating the relatively low pressure gaseous phase should be about 30 p.s.i. above the separator pressure following the reaction zone. Although not mentioned in detail, for the preferred embodiment, it is to be noted that the liquid phase from the separator following the reaction zone will have to be pumped into the relatively high pressure discharge line from the compressor so that the final separation can be made at a relatively high pressure.

The unique features of this invention are best understood by a comparison with the well known prior art schemes. Normally, the prior art schemes will operate the catalyst operation at from 300 to 450 p.s.i.g. The separator following the reaction zone is at substantially the same pressure allowing for pressure drop through the system. The prior art scheme then separates the hydrogen-containing phase in this separator and, generally, passes a portion of this hydrogen through compressing means back into the reaction zone. Since the entire catalytic reforming system has a significant pressure drop, the recycle hydrogen gas stream must be compressed in order to overcome such pressure drop.

The desired reformed product, according to the prior art schemes, is removed from the same separator and passed into recovery means such as fractionation and/or solvent extraction systems.

With reference to the description of the present invention, it can be seen that the present invention has the added features of splitting the hydrogen gas and compressing each separate portion to a different pressure level. The compressed hydrogen gas streams are then returned in novel fashion to different portions of the catalytic reaction zone. Furthermore, the present invention contacts the relatively high pressure compressed gas, preferably, with all of the liquid product separated from the effluent of the reaction zone and, then, making an additional separation of the hydrogen gas at a relatively high pressure. The effect of this compression and contacting at the higher pressure level with the liquid product, is to remove, in a one stage absorption operation, a significant portion of the hydrocarbon contaminants from the hydrogen gas stream without significantly increasing either capital investment costs or operating expenses.

In fact, as will be more fully discussed hereinbelow, the practice of the present invention results in considerable economy in both capital expenses and operating expenses over the typical and conventional prior art scheme.

The invention may be more fully understood with reference to the appended drawing which is a schematic representation of apparatus for practicing one embodiment of the present invention.

DESCRIPTION OF THE DRAWING

Referring now to the drawing, a petroleum derived naphtha fraction is introduced via line 10 wherein it is admixed with a hydrogen-containing gaseous stream via line 11, the source of which is more fully developed hereinbelow. The mixture of hydrogen and fresh feed passes through effluent-feed exchanger 12 and into reactor heater 14 via line 13. The heated hydrogen gas feed mixture is withdrawn from reactor heater 14 and passed into catalytic reactor 16, the first of three reactors comprising the catalytic reforming reaction zone which is maintained under the previously mentioned catalytic reforming operating conditions including the presence of a platinum-containing catalyst.

Since the catalytic reforming reaction is endothermic in nature, the effluent from reactor 16 is withdrawn via line 17 and passed through another section of reactor heater 14 for the reheating of the effluent to reaction temperature. The reheated effluent from reactor 16 is withdrawn from heater 14 via line 18 and passed into another catalytic reforming reactor 19 which is also maintained under reforming conditions.

The effluent from reactor 19 is withdrawn via line 20 and admixed with a hydrogen-containing stream from line 21, the source of which is more fully developed hereinbelow. This admixture of hydrogen and reaction zone effluent is passed via line 22 again through still another portion of heater 14 for the heating thereof to reaction temperature. The effluent-hydrogen mixture is withdrawn from heater 14 via line 23 and passed into the last reactor 24 of the series of reactors which comprise the reactor zone. Reactor 24 is similarly maintained under reforming conditions including the presence of platinum catalyst and an atmosphere of hydrogen. The total effluent from reactor 24 is withdrawn via line 25 and passed into effluent-feed exchanger 12 wherein the effluent provides heat to the incoming feed stream. The effluent continues through cooler 26 and is introduced into product separator 27 from line 25 at a temperature from 60° F. to 120° F. and a pressure from 85 p.s.i.g. to 200 p.s.i.g.

The pressure in product separator 27 is substantially the same as that maintained in reactor 24, although such pressure is considerably lower than the pressure of the feed material entering reactor 16 due to the pressure drop through the system. Sufficient residence time is imposed on separator 27 so that a relatively impure hydrogen stream is separated via line 28 and a normally liquid product stream is separated and removed via line 31. The material in line 31 contains the reformed hydrocarbons, to wit: gasoline boiling range hydrocarbons, such as benzene, toluene, and xylene.

The relatively impure hydrogen-containing stream in line 28 is passed into compressor 17 which is of the type that has a split discharge mechanism for releasing the compressed gas at, at least, two different pressure levels. The purpose of compressor 29 is to raise a portion of the material from line 28 to a relatively low pressure, e.g. about 30 p.s.i. higher than the pressure maintained in separator 27. Compressor 29 also increases the pressure of another portion of the material from line 28 to a relatively high pressure; that is, a pressure of at least 50 p.s.i. higher than the relatively low pressure previously indicated.

The relatively low pressure hydrogen stream containing light hydrocarbons as contaminants is withdrawn at a pressure of about 30 p.s.i. higher than the pressure in separator 27 via line 21 and passed into admixture with the effluent from the last reactor 19 from line 20, as previously mentioned. Alternatively, if additional reheat is not required at least a portion of the compressed relatively low pressure hydrogen stream in line 21 may be passed via line 57 into admixture with the heated effluent in line 23 for passage into the last reactor 24 in the manner previously described. Typically, the material in line 21 comprises about 80% hydrogen on a mol basis and typically will be from 35% to 65% of the total gaseous stream in line 28. In a preferred manner of operation, the volume split of line 28 is approximately 50:50 between the low pressure discharge and the high pressure discharge.

The previously mentioned other portion of hydrogen from line 28 is compressed in compressor 29 to a relatively high pressure, e.g. at least 50 p.s.i. higher than the pressure of the material in line 21 and withdrawn via line 30 for further processing.

Returning now to separator 27, the normally liquid product stream which had been separated and withdrawn via line 31 is boosted in pressure by a pump 32 and passed into admixture with a returning liquid product stream from line 33 through line 35 into the high pressure discharge line 30 from compressor 29. The entire liquid-hydrogen mixture is then passed via line 36 through cooler 37 into high pressure separator 38 at a temperature from 60° F. to 120° F. and a pressure from 180 p.s.i.g. to 300 p.s.i.g. The material in line 30 generally will comprise from 65% to 35% of the total gaseous stream from line 28.

Suitable conditions, as previously mentioned, are maintained in high pressure separator 38 sufficient to yield a gaseous stream comprising relatively pure hydrogen which is removed via line 39 and to yield a liquid product stream containing reformed hydrocarbons, including at least a portion of the contaminants which were originally present in the hydrogen gas stream from line 30. This liquid product stream is removed via line 41, boosted in pressure via pump 42 and passed via line 41 into stabilizer column 43 which is maintained under a pressure of from 250 p.s.i.g. to 300 p.s.i.g., a top temperature from 170° F. to 300° F., and a bottoms temperature from 400° F. to 500° F. A gaseous fraction is removed from stabilizer column 43 via line 48, condensed in condenser 49, and passed into receiver 50. A fuel gas component comprising residual or dissolved hydrogen, methane, and ethane is withdrawn via line 51 and disposed of, preferably, through a fuel system. The remaining light hydrocarbons comprising primarily ethane, propane, and a small amount of butane, is withdrawn via line 52 and pumped out of the system with pump 53 via line 54. As needed, a portion of the material in line 52 is returned via line 55 into the top portion of stabilizer column 43 as reflux thereon.

A side-cut is withdrawn from column 43 via line 56 and comprises the reformed hydrocarbons in high concentration, commonly called "reformate." The heavier materials from the reaction zone accumulate in the lower portion of column 43, are withdrawn via line 46 with a portion thereof being returned through reboiler circuit 47 for the supplying of heat to stabilizer column 43. The net bottoms product from column 43 is passed via line 46 into the upper section of absorber 44 which is maintained under absorption conditions, including an average temperature of from 90° F. to 150° F.

Returning now to separator 38, the high pressure separator, it was noted that a relatively pure hydrogen stream had been withdrawn via line 39. A portion of the material in line 39 is now passed via line 11 into admixture with the incoming feed stream from line 10, as previously described. It is to be noted that the relatively pure hydrogen stream in line 39 comprises, for example, 85% hydrogen on a mol basis. The net amount of hydrogen in line 39 is passed via line 40 into the lower portion of absorber 44.

In absorber 44 the hydrogen gas still containing significant amounts of light hydrocarbons passes upwardly through absorber 44 and is scrubbed by the downward passing relatively heavy hydrocarbons which have been previously introduced from line 46. This absorption operation further purifies the hydrogen gas so that a net hydrogen stream is withdrawn from the system via line 45 and comprises a significantly purified hydrogen stream for use in other hydrogenation reactions, such as hydrodesulfurization of other hydrocarbons.

The rich absorber oil is withdrawn from the lower end of absorber 44, increased in pressure via pump 34, and passed through line 43 into admixture with the liquid product stream from separator 27 in line 31 and in further admixture with the compressed relatively high pressure impure hydrogen stream in line 30, as previously mentioned.

As previously mentioned, the present invention permits the upgrading of the off-gas hydrogen for recycle purposes at a surprisingly lower cost. In addition, the present invention permits a considerable saving in utilities particularly with respect to the capital cost of compressor 29 and the operating cost thereof. The following examples are furnished to demonstrate the lower costs achievable by the practice of the present invention.

Example I

A commercial scale catalytic reforming plant was designed to process a naphtha feedstock. Those skilled in the art will recognize that this plant will require certain well known pieces of equipment in addition to pumps, compressors, valves, pipes, etc. The purpose of this Example I is to provide those skilled in the art with a basic economic assessment of a plant designed and operated in accordance with the present invention compared to a plant designed and operated with the prior art schemes previously mentioned hereinabove. This example shows the economic benefits to be gained by the one-stage absorption step which is practiced on the compressed relatively high pressure hydrogen stream. By conventional economic analysis, it was found that the present inventive scheme utilizing the one-stage absorption step saved from $10,000 to $15,000 per year in operating expenses for fuel and from $15,000 to $20,000 per year in operating expenses for motive power to drive major pumps.

In addition to the total savings calculated to show the advantages of the one-step absorption step over the prior art, there is also achieved other advantages by the practice of the present invention shown in more detail in Example II hereinbelow.

Example II

The typical prior art scheme separates the effluent from the reaction zone into a hydrogen fraction and a liquid product-containing fraction is previously mentioned. The hydrogen fraction is then compressed and returned to the reaction zone. The reformed hydrocarbons are recovered from the liquid product, usually by fractionation. For comparative purposes the following data is presented to show conditions of operation for a typical prior art scheme using the compressor to boost the recycle hydrogen to reaction zone pressure and condition for the novel "split flow" scheme of the present invention. In order for the comparative data to be more meaningful the one stage contacting of the compressed gas with the liquid product has not been shown in either case (prior art or present invention):

| Attached drawing line No. | Prior art | | | Invention | | |
|---|---|---|---|---|---|---|
| | Mols per hr. | T, °F. | P, p.s.i.g. | Mols per hr. | T, °F. | P, p.s.i.g. |
| 15 | 5,282 | 980 | 145 | 3,067 | 980 | 145 |
| 21 | | | | 2,215 | 160 | 125 |
| 25 | 6,618 | | 115 | 6,618 | | 115 |
| 28 | 5,814 | 280 | 100 | 5,814 | 280 | 100 |
| 30 | | | | 3,599 | 280 | 105 |
| 31 | 804 | 100 | 205 | 804 | 100 | 205 |
| 11 | 4,430 | 100 | 200 | 2,215 | 100 | 200 |
| 41 | 850 | 100 | 200 | 850 | 100 | 200 |

Compressor brake horsepower:
  Prior art _____ 3163
  Invention _____ 2345

Thus, the above data shows the substantial reduction (818 B.H.P.) in compressor horsepower achieved by operating in the "split flow" manner of the invention as compared to the conventional prior art scheme.

Without unduly complicating the economic analysis and without presenting more detailed calculations thereof, suffice it to say, that it was surprising to find that the present invention would effect such considerable total economy of operation. As those skilled in the art know well, economic analysis is relevant and dependent upon the particular economic characteristics important to an individual processer. Other obvious economic factors include charge stock characteristics chosen, particular operating conditions desired, product quality, etc. All of these items, of course, influence the magnitude of any economic evaluation.

However, the practice of the present invention achieves its characteristic economy for those operations which produce a relatively impure hydrogen off-gas stream; for example, those operations that produce hydrogen off-gas at a purity from 50% to 80% by volume and which are operated at relatively low pressures, such as from 100 to 300 p.s.i.g. through the reaction system. It is submitted, however, that the practice of the present invention will produce considerable economy of operation over the prior art scheme in virtually every instance.

Even though the embodiment of the present invention described with reference to the attached drawing, indicated only three (3) reactors, it is intended that the present invention include operations using a plurality of reactors or catalyst beds, e.g. more than two (2), and in most cases, the preferred reactor configuration will comprise four (4) reactors containing a single catalyst bed each.

PREFERRED EMBODIMENT

Therefore, from the detailed description presented hereinabove, a preferred embodiment of this invention provides an improvement in a process for catalytic reforming of hydrocarbons in the presence of recycle hydrogen to produce high quality gasoline boiling range products which improvement comprises the steps of: (a) introducing the hydrogen-containing effluent from the reforming reaction zone into a first separation zone maintained under separation conditions including a temperature from 60° F. to 120° F. and a pressure from 85 p.s.i.g. to 200 p.s.i.g.; (b) withdrawing from said first separation zone a gaseous stream comprising hydrogen contaminated with $C_2+$ hydrocarbons, and a liquid steam containing relatively high quality gasoline boiling range products; (c) compressing from 35% to 65% of said gaseous stream to a relatively low pressure of at least 20 p.s.i. higher than said first separation zone pressure; (d) compressing from 65% to 35% of said gaseous stream to a relatively high pressure of at least 50 p.s.i. higher than said relatively low pressure; (e) admixing said compressed relatively high pressure gaseous stream with at least a portion of said liquid stream of step (b); (f) introducing said admixture into a second separation zone maintained under separation conditions including a temperature from 60° F. to 120° F. and a pressure from 135 p.s.i.g. to 300 p.s.i.g.; (g) withdrawing from said second separation zone a hydrogen stream having reduced contaminant content, and a product stream containing relatively high quality gasoline boiling range products; and, (h) returning at least a portion of said hydrogen stream of step (g) and said compressed relatively low pressure gaseous stream of step (c) to the reforming reaction zone.

The invention claimed:

1. Method for catalytically reforming a hydrocarbon fraction boiling in the range from about 90° F. to 450° F. which comprises the steps of:
   (a) admixing said hydrocarbon fraction and a hereinafter specified hydrogen stream;
   (b) subjecting said admixture from step (a) to catalytic reforming conditions in a first reaction zone;
   (c) admixing the total effluent from said first reaction zone and a hereinafter specified hydrogen stream;
   (d) subjecting said admixture from step (c) to catalytic reforming conditions in a second reaction zone.
   (e) separating the effluent from said second reaction zone into a hydrogen fraction and a liquid hydrocarbon fraction;
   (f) compressing a portion of said hydrogen fraction of step (e) to a relatively low pressure thereby producing a first hydrogen stream;
   (g) compressing another portion of said hydrogen fraction of step (e) to a relatively high pressure at least about 50 p.s.i. higher than said relatively low pressure thereby producing a second hydrogen stream;
   (h) returning said first hydrogen stream to admixture with the total effluent from said first reaction zone as specified in step (c);
   (i) returning at least a portion of said second hydrogen stream to admixture with said hydrocarbon fraction as specified in step (a); and,
   (j) recovering reformed hydrocarbons from the liquid hydrocarbon fraction of step (e).

2. Method according to claim 1 wherein said reforming conditions include supported platinum catalyst, a temperature from 500° F. to 1050° F., pressure from 50 p.s.i.g. to 1200 p.s.i.g., weight hourly space velocity from 0.2 to 40, and the presence of a hydrogen-containing gas equivalent to a hydrogen-to-hydrocarbon mole ratio from 0.5 to 15.0.

3. Method according to claim 2 wherein said pressure is from 100 to 300 p.s.i.g.

4. Method for dehydrogenation which comprises dehydrogenating a dehydrogenatable material in the presence of recycle hydrogen in a reaction zone to yield an effluent containing hydrogen admixed with dehydrogenated normally liquid product; separating said effluent into a gaseous stream comprising relatively impure hydrogen and a liquid stream containing dehydrogenated product; compressing a portion of said gaseous stream to a relatively low pressure; compressing another portion of said gaseous stream to a relatively high pressure at least about 50 p.s.i. higher than said relatively low pressure; admixing the compressed relatively high pressure gaseous stream with at least a portion of said liquid stream; separating said admixture into a gaseous fraction comprising relatively pure hydrogen and a liquid stream containing dehydrogenated product; returning said relatively pure hydrogen stream to said reaction zone in admixture with said dehydrogenatable material; returning the compressed relatively low pressure gaseous stream to said reaction zone; and, recovering dehydrogenated product in high concentration.

5. Method according to claim 4 wherein said relatively low pressure is less than 250 p.s.i.g.

6. In a process for catalytic reforming of hydrocarbons in the presence of recycle hydrogen to produce high quality gasoline boiling range products, the improvement which comprises the steps of:
   (a) introducing the hydrogen-containing effluent from the reforming reaction zone into a first separation zone maintained under separation conditions including a temperature from 60° F. to 120° F. and a pressure from 85 p.s.i.g. to 200 p.s.i.g.;
   (b) withdrawing from said first separation zone a gaseous stream comprising hydrogen contaminated with $C_2+$ hydrocarbons, and a liquid stream containing relatively high quality gasoline boiling range products;
   (c) compressing from 35% to 65% of said gaseous stream to a relatively low pressure of at least 20 p.s.i. higher than said first separation zone pressure;
   (d) compressing from 65% to 35% of said gaseous stream to a relatively high pressure of at least 50 p.s.i. higher than said relatively low pressure;
   (e) admixing said compressed relatively high pressure gaseous stream with at least a portion of said liquid stream of step (b);
   (f) introducing said admixture into a second separation zone maintained under separation conditions including a temperature from 60° F to 120° F. and a pressure from 135 p.s.i.g. to 300 p.s.i.g.;
   (g) withdrawing from said second separation zone a hydrogen stream having reduced contaminant content, and a product stream containing relatively high quality gasoline boiling range products; and,
   (h) returning at least a portion of said hydrogen stream of step (g) and said compressed relatively low pressure gaseous stream of step (e) to the reforming reaction zone.

7. Improvement according to claim 6 wherein the catalytic reaction zone comprises a plurality of serially connected separate fixed catalyst beds and wherein said hydrogen stream of step (g) is returned to the first such bed and the compressed gaseous stream of step (c) is returned to the last such bed.

8. Method according to claim 1 wherein said second hydrogen stream, prior to being returned in admixture with said hydrocarbon fraction, is subjected to purification to reduce the light hydrocarbon content thereof.

References Cited

UNITED STATES PATENTS 3,374,167    3/1968    Craig et al. _____ 208—138

DELBERT E. GANTZ, Primary Examiner

A. RIMENS, Assistant Examiner

U.S. Cl. X.R.

208—95, 139